United States Patent [19]

Nakajima

[11] Patent Number: 4,805,989
[45] Date of Patent: Feb. 21, 1989

[54] MULTI-LAYERED BACK REFLECTING MIRROR

[75] Inventor: Yuji Nakajima, Tokyo, Japan

[73] Assignee: Hoya Corporation, Tokyo, Japan

[21] Appl. No.: 98,346

[22] Filed: Sep. 18, 1987

[30] Foreign Application Priority Data

Sep. 18, 1986 [JP] Japan .................. 61-220657

[51] Int. Cl.$^4$ .................. G02B 5/08; G02B 5/28
[52] U.S. Cl. .................. 350/164; 350/166; 350/278; 350/642
[58] Field of Search ........... 350/164, 166, 642, 276 R, 350/278, 276 SL, 277

[56] References Cited

U.S. PATENT DOCUMENTS

| | | | |
|---|---|---|---|
| 4,352,006 | 9/1982 | Zega | 350/164 |
| 4,634,242 | 1/1987 | Taguchi et al. | 350/166 |
| 4,673,248 | 6/1987 | Taguchi et al. | 350/166 |

FOREIGN PATENT DOCUMENTS

| | | | |
|---|---|---|---|
| 57-144504 | 9/1982 | Japan . | |
| 59-195205 | 11/1984 | Japan | 350/164 |
| 60-98405 | 6/1985 | Japan . | |
| 60-212704 | 10/1985 | Japan | 350/164 |
| 60-212705 | 10/1985 | Japan | 350/164 |

Primary Examiner—John K. Corbin
Assistant Examiner—Martin Lerner
Attorney, Agent, or Firm—Sughrue, Mion, Zinn, Macpeak & Seas

[57] ABSTRACT

A multi-layered back reflecting mirror having a dielectric multi-layered coating on one side of a glass or plastic transparent substrate which is further overlaid with a light-absorbing layer. The dielectric multi-layered coating is composed of four to eight dielectric layers laminated one on top of another having alternately differing refractive indices. At least one of these dielectric layers has an optical thickness of $\lambda_0/2$ ($\lambda_0$ is the wavelength of light used as the reference measurement for design purposes) and each of the remaining dielectric layers has an optical thickness of $\lambda_0/4$. The mirror has a relative reflection minimum for visible light in the range of 480 to 550 nonometers.

8 Claims, 4 Drawing Sheets

MULTI-LAYERED BACK REFLECTING MIRROR

BACKGROUND OF THE INVENTION

The present invention relates to a reflector mirror, and more particularly, to a multi-layer back reflecting mirror having superior properties in terms of such aspects as freedom from glare, visibility and decorative finish.

The multi-layered back reflecting mirror of the present invention is useful in such applications as automotive rearview mirrors, mirrors with a convex surface that warn drivers against hazards on the road ahead, and ornamental mirrors.

Conventional mirrors such as automotive rearview mirrors are generally composed of a glass substrate that is coated on its back side with a metal coating such as of aluminum or chromium which is further overlaid with a protective coating.

Multi-layered surface reflecting mirrors have recently been marketed and they consist of a glass substrate that has a dielectric multi-layered coating on its front side and a black light-absorbing coating on the back side. Multi-layered back reflecting mirrors have also been proposed and they consist of a glass substrate that has a dielectric multi-layered coating on one side which is overlaid with a black light-absorbing coating. In the mirror of this type as disclosed in Unexamined Published Japanese Patent Application No. 144504/1982, the dielectric multi-layered coating consists of five alternate films of $TiO_2$ and $SiO_2$ that have thicknesses of $\lambda/4$ or $3\lambda/4$ or a combination thereof. Another example of the multi-layered back reflecting mirror is disclosed in Unexamined Published Japanese Patent Application No. 98405/1985 and the dielectric multi-layered coating employed in this mirror consists of four alternate films of $TiO_2$ and $SiO_2$ each having a thickness of $n\lambda/4$ (where n is an odd number).

The above-described prior art reflector mirrors have spectral reflection characteristics as shown in FIG. 2, in which curve (a) refers to the aluminum mirror. As this curve (a) shows, the aluminum mirror has a high reflectance (80–90%) and flat reflection characteristics which are not dependent upon wavelength. If this aluminum mirror is used as a rear-view mirror in an automobile, it will cause strong reflection of the light flux coming from the headlights of a vehicle running behind at night and a driver who has adapted his sense of vision to the brightness of the field ahead will feel very tired because of the glare caused by this reflected light.

The spectral reflection characteristics of the prior art chromium mirror are shown by curve (b) in FIG. 2. As this curve (b) shows, the chromium mirror has a low reflectance (38–50%) and exhibits a certain degree of freedom from glare compared with the aluminum mirror having high reflectance. However, the glareless property of the chromium mirror is not as high as expected because of its flat spectral characteristics and, in addition, the visibility of the chromium mirror is rather poor.

A commercial multi-layered surface reflector mirror comprises a glass substrate that has a three-layered ($TiO_2$—$SiO_2$—$TiO_2$) coating formed on the front side and a light-absorbing coating on the back side. This three-layered surface reflector mirror has spectral reflection characteristics as shown by curve (c) in FIG. 2. This reflector mirror has a reflectance of 48% and satisfies the reflectance requirement specified in JIS D 5705 "Automotive Mirror System" which calls for a minimum reflectance of 38% in the chromium mirror. However, as is clear from curve (c) in FIG. 2, the reflectance of this reflector mirror peaks in the range of 430–550 nm and drops sharply in the longer range up to 700 nm, causing the mirror to reflect bluish light. As a result, the color balance of the view provided by the mirror is greatly upset in such a way that a reddish color is particularly difficult to recognize and that the visibility of the mirror is impaired.

The spectral luminous efficiency $V'(\lambda)$ of the human eye, the spectral energy characteristics $P(\lambda)$ of a headlight of an automobile, and the product of $P(\lambda) \times V'(\lambda)$ are shown by three different curves in FIG. 3. As these curves show, the response of a driver's eyes to the headlights of a vehicle running behind at night is the highest at a wavelength between 480 and 550 nm. Since this range coincides with the region where the peak of the spectral reflectance curve (c) in FIG. 2 occurs, the ability of the three-layered surface reflecting mirror and other conventional surface reflecting mirrors to prevent glare from the headlights of a vehicle to the rear is not as high as expected. These surface reflecting mirrors have an additional disadvantage in terms of durability since the coatings formed on the glass substrate are highly prone to develop surface flaws when they are contacted by sand and dust or when they are rubbed by a brush during car washing.

The dielectric multi-layered back surface reflecting mirrors shown in Unexamined Published Japanese Patent Application Nos. 144504/1982 and 98405/1985 are formed by coating a dielectric multi-layered film on the back side of a glass substrate. Unlike the surface reflecting mirrors, these back surface reflecting mirrors have no problem in terms of durability but as is clear from curve (d) in FIG. 2 (the spectral reflectance curve of the mirror shown in Unexamined Published Japanese Patent Application No. 144505/1982) and from curve (e) (the spectral reflectance curve of the mirror shown in Unexamined Published Japanese Patent Application No. 98405/1985), the visibility of these back reflecting mirrors and their freedom from glare are not satisfactory for the same reasons as noted for the surface reflecting mirrors.

OBJECTS AND SUMMARY OF THE INVENTION

An object, therefore, of the present invention is to solve the aforementioned problems of the prior art reflector mirrors, both surface and back reflection types, and to provide a reflector mirror having improved properties in regard to such aspects as freedom from glare, visibility and decorative finish.

The present inventors conducted various studies on the composition of a dielectric multi-layered coating to be formed on one side of a glass or plastic transparent substrate and which is to be overlaid with a light-absorbing layer so as to prepare a multi-layered back reflecting mirror. The dielectric multi-layered coating finally produced by the inventors was composed of four to eight dielectric layers laminated one on top of another having alternately differing refractive indices, and at least one of these laminated dielectric layers had an optical thickness of $\lambda_0/2$ ($\lambda_0$ is the wavelength of light to be used as the reference measurement for design purposes and is desirably set in the range of 500–580 nm for an incident angle of 0°), with each of the remaining dielectric layers having an optical thickness of $\lambda_0/4$. The present inventors found that a multi-layered dielectric coating having this composition has a greater degree of freedom from glare since the reflectance in the range of 480-550 nm where high spectral luminous efficieny for dark adaptation occurs was reduced. It was also found that this multi-layered dielectric coating offered an improved range of level visibility since the reflectances in the ranges of 430-480 nm and 580-750 nm for blue and red colors, respectively, which have lower levels of brightness to the human eye than the other primary color, green, were increased. The present invention has been accomplished on the basis of these findings.

The present invention provides a multi-layered surface reflector mirror having a dielectric multi-layered coating on one side of a glass or plastic transparent substrate which is further overlaid with a light-absorbing layer, said dielectric multi-layered coating being composed of four to eight dielectric layers laminated one on top of another having alternately differing refractive indices, at least one of these dielectric layers having an optical thickness of $\lambda_0/2$ ($\lambda_0$ is the wavelength of light used as the reference measurement for design purposes) and each of the remaining dielectric layers having an optical thickness of $\lambda_0/4$.

DESCRIPTION OF THE PREFERRED EMBODIMENTS

Figure 1A:
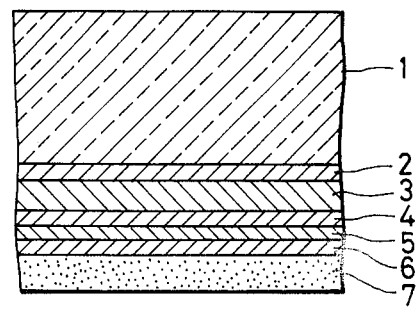
FIGS. 1A, 1B and 1C are each cross-sectional views showing on an enlarged scale the essential part of a multi-layered back reflecting mirror according to various respective embodiments of the present invention.

The present invention is hereunder described in detail.

As already mentioned, the dielectric multi-layered coating in the multi-layered back reflecting mirror of the present invention is composed of four to eight (4-8) dielectric layers in a laminated relationship having alternately differing refractive indices. In a particularly preferred embodiment, the dielectric coating is composed of layers of a material having a high refractive index (1.9-2.4) that alternate with layers of material having a low refractive, index (1.3-1.8) to give a total number of layers of five or six. Each of the layers of a material having a high refractive index is formed of one or more materials having a high refractive index, and each of the layers of a material having a low refractive index is also formed of one or more materials having a low refractive index. Illustrative materials having a high refractive index include oxides such as $TiO_2$, $Ta_2O_5$, $ZrO_2$, $CeO_2$ and $HfO_2$, sulfides such as ZnS, and mixtures thereof and these may be employed as appropriate. Illustrative materials having a low refractive index include $MgF_2$, $SiO_2$, $CeF_3$, $Al_2O_3$ and mixtures thereof, and these may be employed as appropriate.

Referring to the thickness of the dielectric layers of which the dielectric multi-layered coating is made, it is essential for the purposes of the present invention that at least one of the dielectric layers which are laminated one on another in a total number of 4-8, preferably 5 or 6, should have an optical thickness of $\lambda_0/2$, with each of the remaining layers having an optical thickness of $\lambda_0/4$. If layers of a material having a high refractive index alternate with layers of a material having a low refractive index in such a way that each of the layers laminated one on another has an optical thickness of $\lambda_0/4$, the light reflected from one interface between layers will interfere with the light reflected from another interface and the resulting amplification effect produces spectral reflection characteristics in which a maximum reflectance occurs at $\lambda_0$, the wavelength of light used as the reference measurement for design purposes. If, on the other hand, alternating layers having an individual thickness of $\lambda_0/4$ are interleaved with a layer having a thickness of $\lambda_0/2$, spectral reflection characteristics are attained in which the reflectance at or near $\lambda_0$ is comparatively lower than the values in the shorter and longer wavelength ranges.

During commercial production of the multi-layered back reflecting mirror of the present invention, the layers in the dielectric multi-layered coating that are to have an optical thickness of $\lambda_0/4$ should be controlled over the range of from $\lambda_0/4 \times 0.8$ to $\lambda_0/4 \times 1.2$, and the layers that are to have an optical thickness of $\lambda_0/2$ should be controlled over the range of from $\lambda_0/2 \times 0.8$ to $\lambda_0/2 \times 1.2$. The individual dielectric layers may be formed by various methods including physical coating techniques such as evaporation, sputtering and ion plating, chemical vapor deposition (CVD) techniques, and thin-film forming techniques such as one employing an organic coating solution.

The multi-layered back reflecting mirror of the present invention employs glass or plastic as the material of the transparent substrate on which the dielectric multi-layered coating is formed. Glass is a particularly preferable substrate material. The light-absorbing layer formed over the dielectric multi-layered coating is preferably of a black color.

The following examples are given for the purpose of further illustrating the preferred embodiments of the present invention but are in no way to be taken to limit the same.

EXAMPLE 1

Figure 4:
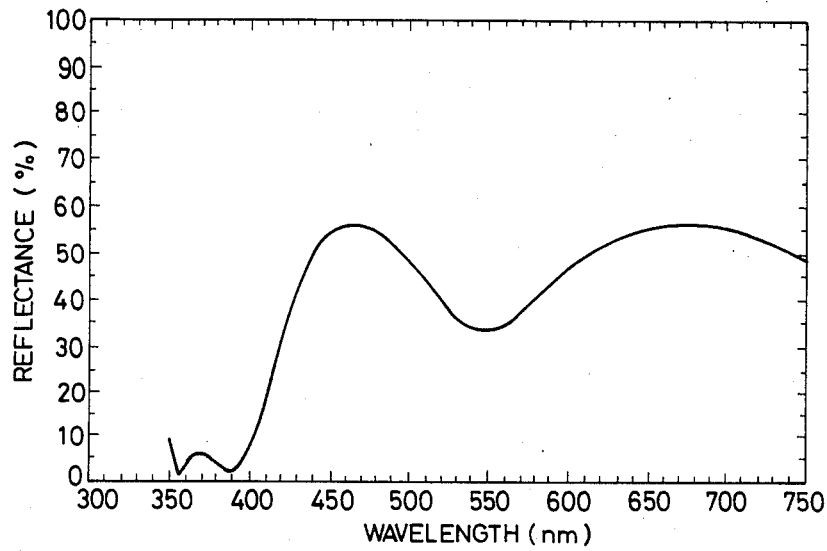
FIG. 4, 5 6 and 7 are spectral reflection characteristic diagrams for a reflector mirror according to various respective embodiments of the present invention.

FIG. 1(A) is a cross-sectional view showing on an enlarged scale the essential part of a multi-layered back reflecting mirror according to a preferred embodiment of the present invention. In this figure, 1 is a glass substrate, 2 is a high-refractive index layer (H layer) that is made of $ZrO_2$ having a refractive index of 2.05 and which has an optical thickness of $\lambda_0/4$ (135 nm), 3 is a low-reflective index layer (2L layer) that is made of $Al_2O_3$ having a refractive index of 1.62 and which has an optical thickness of $\lambda_0/2$ (270 nm), 4 is a high-refractive index layer (H layer) that is made of $TiO_2$ having a refractive index of 2.3 and which has an optical thickness of $\lambda_0/4$ (140 nm), 5 is a low-refractive index layer (L layer) that is made of $MgF_2$ having a refractive index of 1.38 and which has an optical thickness of $\lambda_0/4$ (140 nm), 6 is a high-refractive index layer (H layer) that is made of $TiO_2$ having a refractive index of 2.3 and which has an optical thickness of $\lambda_0/4$ (140 nm), and 7 is a black light-absorbing layer. Therefore, the multi-layered back reflecting mirror of Example 1 has a dielectric multi-layered coating formed on one side of the glass substrate that is composed, in order from the substrate side, of H layer, 2L layer, H layer, L layer and H layer, and which is further overlaid with the black light-absorbing layer. The spectral reflecting characteristics of the resulting multi-layered back reflecting mirror are shown in FIG. 4, from which one can see the following: compared with the conventional multi-layered back reflecting mirrors, the mirror of Example 1 has a greater degree of freedom from glare since the reflectance in the range of 480–550 nm having a high value of the product of spectral luminous efficiency for dark adaptation and the spectral energy of a headlight is reduced; secondly, the visibility of this mirror is increased since the reflectances in the ranges of 430–480 nm and 580–700 nm for blue and red, respectively, which have lower levels of brightness to the human eye than green are increased.

The order of depositing dielectric layers in forming the dielectric multi-layered coating of the multi-layered back reflecting mirror of Example 1 may be reversed in such a way that the dielectric layers are formed in the order of H layer, L layer, H layer, 2L layer and H layer on one side of the glass substrate. A multi-layered back reflecting mirror having a dielectric multi-layered coating of this layer arrangement has spectral reflection characteristics that are the same as those depicted in FIG. 4.

EXAMPLE 2

Figure 1B:
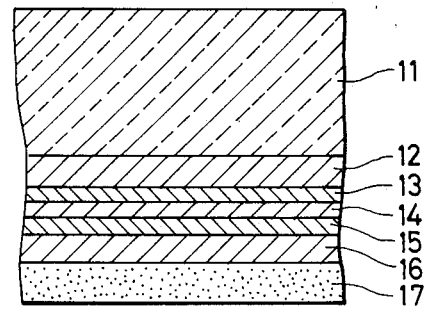

FIG. 1(B) is a cross-sectional view showing on an enlarged scale the essential part of a multi-layered back reflecting mirror according to another embodiment of the present invention. In this figure, 11 is a glass substrate, 12 is a high-refractive index layer (2H layer) that is made of $TiO_2$ having a refractive index of 2.3 and which has an optical thickness of $\lambda_0/2$ (270 nm), 13 is a low-refractive index layer (L layer) that is made of $MgF_2$ having a refractive index of 1.38 and which has an optical thickness of $\lambda_0/4$ (140 nm), 14 is a high-refractive index layer (H layer) that is made of $TiO_2$ having a refractive index of 2.3 and which has an optical thickness of $\lambda_0/4$ (140 nm), 15 is a low-refractive index layer (L layer) that is made of $MgF_2$ having a refractive index of 1.38 and which has an optical thickness of $\lambda_0/4$ (140 nm), 16 is a combination layer in which a high-refractive index layer ($H_1$ layer) that is made of $TiO_2$ having a refractive index of 2.3 and which has an optical thickness of $\lambda_0/4$ (140 nm) is combined with another high-refractive index layer ($H_2$ layer) that is made of $ZrO_2$ having a refractive index of 2.05 which is lower than that of $TiO_2$ (2.3) and which has an optical thickness of $\lambda_0/4$ (140 nm) (this combination layer composed of $H_1$ and $H_2$ layers is equivalent to a 2H layer and has a total thickness of $\lambda_0/2$), and 17 is a black light-absorbing layer. Therefore, the multi-layered back reflecting mirror of Example 2 has a dielectric multi-layered coating formed on one side of the glass substrate that is composed, in order from the substrate side, of 2H layer, L layer, H layer, L layer, and $H_1+H_2$ layer, and which is further overlaid with the black light-absorbing layer. As is clear from FIG. 5, this multi-layered back reflecting mirror had spectral reflection characteristics that were similar to those of the mirror produced in Example 1.

It will be obvious to those skilled in the art that the $H_1$ and $H_2$ combination layer 16 in the dielectric multi-layered coating in the mirror of Example 2 may be formed as a high-refractive index layer (ie, 2H layer) that is composed of a single material having a high-refractive index and which has an optical thickness of $\lambda_0/2$. It also goes without saying that the order of deposition of $H_1$ and $H_2$ layers may be reversed in such a way as to make an $H_2+H_1$ combination layer and in this case, too, the spectral reflection characteristics attained are the same as those shown in FIG. 5.

EXAMPLE 3

Figure 1C:
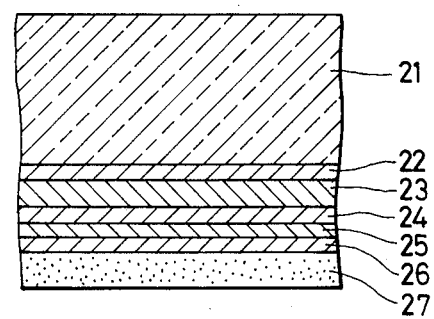
Figure 2:
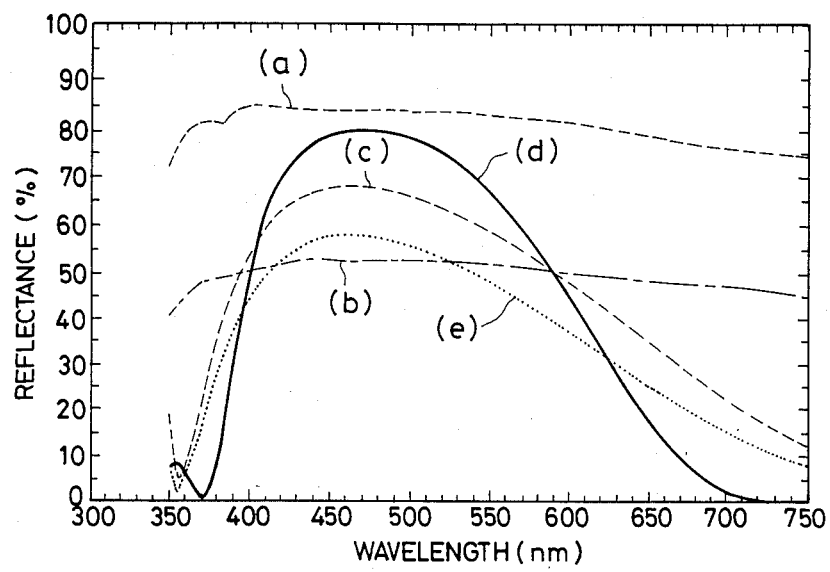
FIG. 2 is a graph showing the spectral reflection characteristics of different types of prior art reflector mirrors.

FIG. 1(C) is a cross-sectional view showing on an enlarged scale the essential part of a multi-layered back reflecting mirror according to still another embodiment of the present invention. In this figure, 21 is a glass substrate, 22 is a high-refractive index layer (H layer) that is made of $ZrO_2$ having a refractive index of 2.05 and which has an optical thickness of $\lambda_0/4$ (135 nm), 23 is a combination layer in which a low-refractive index layer ($L_1$ layer) that is made of $Al_2O_3$ having a refractive index of 1.62 and which has an optical thickness of $\lambda_0/4$ (135 nm) is combined with another low-refractive index layer ($L_2$ layer) that is made of $SiO_2$ having a lower refractive index of 1.46 and which has an optical thickness of $\lambda_0/4$ (140 nm) (this $L_1+L_2$ combination layer is equivalent to a 2L layer and has an optical thickness of $\lambda_0/2$), 24 is a high-refractive index layer (H layer) that is made of $TiO_2$ having a refractive index of 2.3 and which has an optical thickness of $\lambda_0/4$ (140 nm), 25 is a low-refractive index layer (L layer) that is made of $MgF_2$ having a refractive index of 1.38 and which has an optical thickness of $\lambda_0/4$ (140 nm), 26 is a high-refractive index layer (H layer) that is made of $TiO_2$ having a refractive index of 2.3 and which has an optical thickness of $\lambda_0/4$ (140 nm), and 27 is a black light-absorbing layer. Therefore, the multi-layered back reflecting mirror of Example 3 has a dielectric multi-layered coating formed on one side of the glass substrate which is composed, in order from the substrate side, of H layer, $L_1+L_2$ layer, H layer, L layer and H layer, and which is further overlaid with the black light-absorbing layer (this dielectric multi-layered coating is equivalent in composition to that employed in Example 1 except that the 2L layer is replaced by an $L_1+L_2$ combination layer). As is clear from FIG. 6, the multi-layered back reflecting mirror of Example 3 had spectral reflection characteristics that were similar to those exhibited by the mirrors prepared in Examples 1 and 2.

Again, the order of depositing dielectric layers in forming the dielectric multi-layered coating of the multi-layered back reflecting mirror of Example 3 may be reversed in such a way that the dielectric layers are formed in the order of H layer, L layer, H layer, $L_1+L_2$ layer and H layer on one side of the glass substrate. If desired, the order of $L_1$ and $L_2$ layers may be reversed to make an $L_2+L_1$ combination layer. In either case, the resulting spectral reflection characteristics are similar to those depicted in FIG. 6.

In addition to the multi-layered back reflecting mirrors shown in Examples 1 to 3, the present invention also covers the following embodiments: a multi-layered back reflecting mirror that has dielectric layers formed on one side of a glass substrate in the order of 2H layer, L layer, H layer, L layer and H layer or in the reverse order (namely, in the order of H layer, L layer, H layer, L layer and 2H layer) so as to make a multi-layered dielectric coating which is further coated with a black light-absorbing layer; and a multi-layered back reflecting mirror having the same composition as described above except that the 2H layer in the dielectric multi-layered coating is changed to an $H_1+H_2$ or $H_2+H_1$ combination layer.

A back reflecting mirror has such a nature that it provides not only the light flux that is reflected from its back side to construct a desired image but also a reflection from the front side that is unnecessary for constructing this image. In the case of normal incidence, about 4% of the incident light will be reflected from the front side of the mirror. In order to eliminate the occurrence of such unwanted reflection, it may be effective to provide an anti-reflection coating on the front side of the multi-layered back reflecting mirror of the present invention.

The multi-layered back reflecting mirror of the present invention has the following technical advantages.

(i) This mirror has a great degree of freedom from glare.

Figure 3:
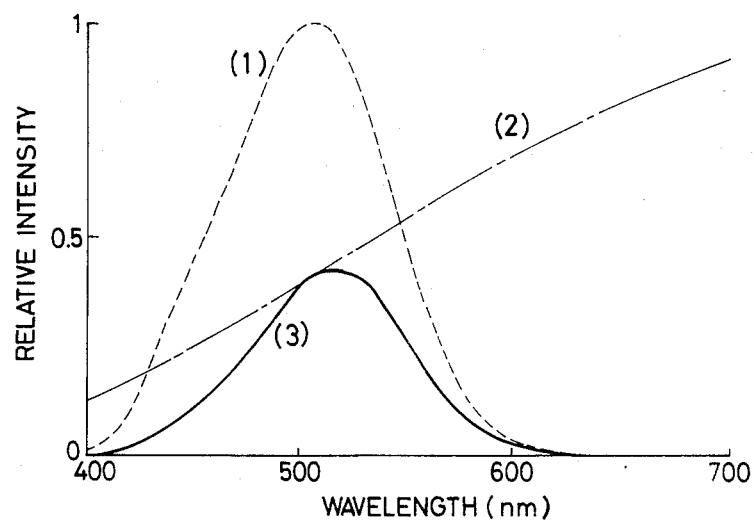
FIG. 3 is a graph showing the spectral energy characteristics of a headlight of an automobile, the spectral luminous efficiency for dark adaptation of the human eye, and the product of these two parameters, namely, the spectral energy characteristics of the headlight of an automobile as perceived by the human eye.

In the case of driving at night where a driver senses the light of the headlamps of a vehicle running behind, the quantity of light flux coming into the driver's eye after being reflected by the reflector mirror is obtained by multiplying the intensity (power) of the light $P(\lambda)$ [shown by curve (1) in FIG. 3] times the eye's response to power $V'(\lambda)$ (spectral luminous efficiency form dark adaptation) [shown by curve (2) in FIG. 3] [the product of these two parameters, $P(\lambda) \times V'(\lambda)$, is plotted by curve (3) in FIG. 3] times the spectral reflectance of the reflector mirror. As is clearly evident from FIG. 3, in order to attain a greater degree of freedom from glare, it is important that the reflectance of the reflector mirror should have a small value in the wavelength region where $P(\lambda) \times V'(\lambda)$ assumes a high value. As one can see from FIGS. 4, 5 and 6, the reflector mirror of the present invention has a low reflectance in the range of 480–550 nm where $P(\lambda) \times V'(\lambda)$ takes on a large value and this provides the mirror with a greater degree of freedom from glare.

(ii) The mirror has a high visibility level.

Figure 5:
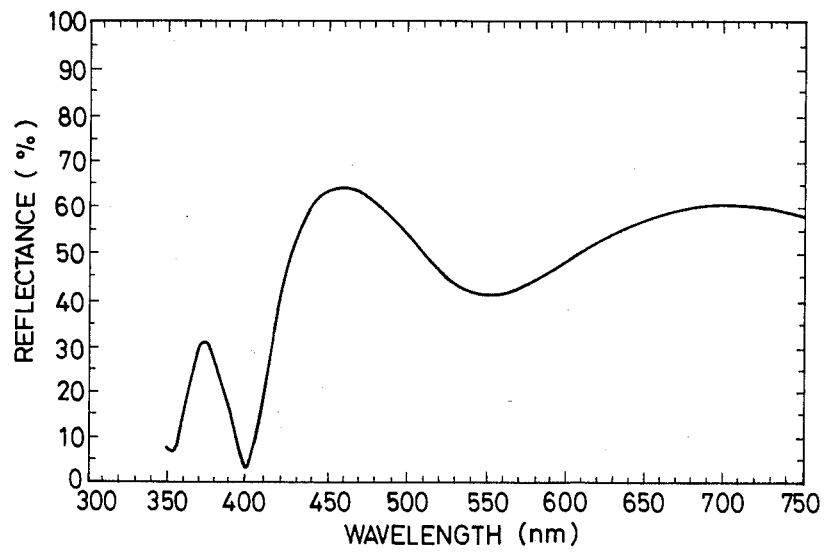
Figure 6:
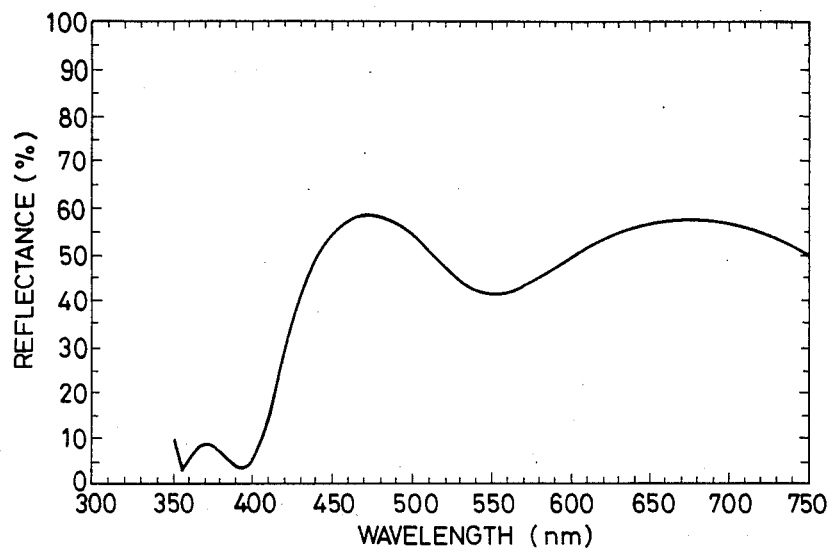

As described in (i), the reflectance of a certain reflector mirror may be reduced in order to provide it with a greater degree of freedom from glare but then this results in the mirror having a lower visibility level. The visibility of a reflector mirror increases as its reflectance increases. As FIGS. 4, 5 and 6 show, the reflector mirror of the present invention has a low reflectance in the range of wavelengths where a greater degree of freedom from glare is ensured but in the other wavelength range, it has a sufficiently high reflectance to assure a superior visibility level.

In addition to favorable reflectance, the mirror is characterized by a good color contrast, which contributes to a further improvement in the visibility offered by the mirror. The three primary colors, blue, green and red, have wavelengths of 400–480 nm, 490–580 nm and 590–700 nm, respectively. In terms of brightness, the visual sensation (stimulus to the eye) is small in the blue and red regions as is clear from FIG. 3. The reflector mirror of the present invention is so designed that it has a lower reflectance in the green region (where a greater visual sensation occurs in terms of brightness) than in the blue and red regions, thereby "sensitizing" these low-brightness colors to provide an improved color contrast.

(iii) The mirror is also improved in terms of both decorative and fashion aspects As a result of the aforementioned accomplishments in improving the degree of freedom from glare and the level of visibility, the reflector mirror of the present invention produces reflected light having a somewhat magenta hue. This magenta hue imparts a feeling of high quality to the mirror, thereby enabling it to be clearly differentiated from other reflector mirrors on the market.

(iv) The mirror blocks any deleterious wavelengths of light.

Figure 7:
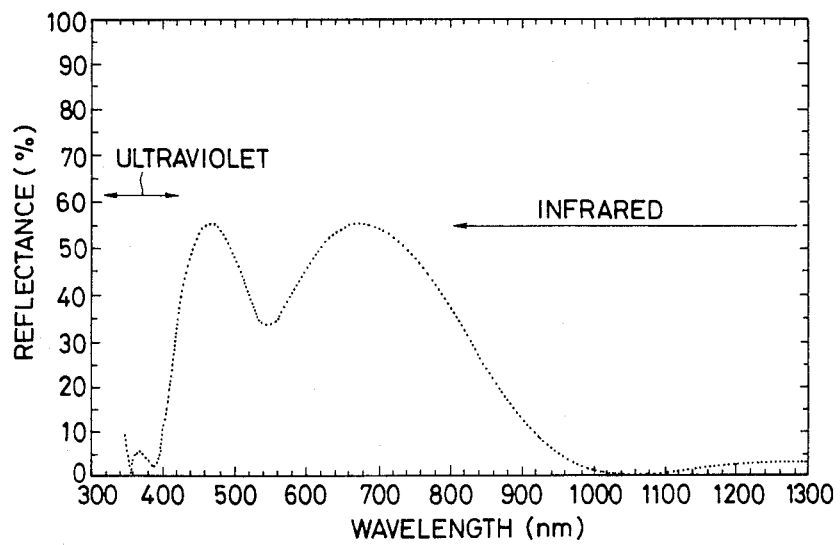

FIGS. 4, 5 and 6 show the spectral reflection characteristics of the reflector mirror of the present invention in the wavelength range of 300–750 nm. The spectral reflection characteristics of the same mirror over the wavelength range extended to 1300 nm are shown in FIG. 7, from which one can see that the reflector mirror of the present invention has the additional advantage of inhibiting and blocking the reflection of any unwanted and deleterious light such as ultraviolet and infrared radiation.

I claim:

1. A multi-layered back reflecting mirror having a dielectric multi-layered coating on one side of a glass or plastic transparent substrate which is further overlaid with a light-absorbing layer, said dielectric multi-layered coating being composed of four to eight dielectric layers laminated one on top of another having alternately differing refractive indices, at least one of said dielectric layers having an optical thickness of $\lambda_0/2$, wherein $\lambda_0$ is the wavelength of light used as the reference measurement for design purposes, each of the remaining dielectric layers has an optical thickness of $\lambda_0/4$, and said mirror has a relative reflection minimum for visible light in a range of 480 to 550 nanometers.

2. A multi-layered back reflecting mirror according to claim (1) wherein the dielectric multi-layered coating is composed of five or six dielectric layers.

3. A multi-layered back reflecting mirror according to claim (2) wherein the dielectric multi-layered coating is composed of dielectric layers which are formed on one side of the transparent substrate in the order, as seen from the substrate side, of an H layer, a 2L layer, an H layer, an L layer and an H layer, or in the order of an H layer, an L layer, an H layer, a 2L layer and an H layer, the H layer being a high-refractive index layer that is made of a material having a high refractive index of 1.9–2.4 and which has an optical thickness of $\lambda_0/4$, the 2H layer being a high-refractive index layer that is made of a material having a high refractive index of 1.9–2.4 and which has an optical thickness of $\lambda_0/2$, the L layer being a low-refractive index layer that is made of a material having a low refractive index of 1.3–1.8 and which has an optical thickness of $\lambda_0/4$, and the 2L layer being a low-refractive index layer that is made of a material having a low refractive index of 1.3–1.8 and which has an optical thickness of $\lambda_0/2$.

4. A multi-layered back reflecting mirror according to claim (3) where the 2L layer is a combination layer in which a low-refractive index layer ($L_1$ layer) that is made of a low-refractive index material and which has an optical thickness of $\lambda_0/4$ is combined with another low-refractive index material and which has an optical thickness of $\lambda_0/4$.

5. A multi-layered back reflecting mirror according to claim (2) wherein the dielectric multi-layered coating is composed of dielectric layers that are formed on one side of the transparent substrate in the order of the 2H layer, L layer, H layer, L layer and 2H layer.

6. A multi-layered back reflecting mirror according to claim (5) wherein one or both of the two 2H layers is a combination layer in which a high-refractive index layer ($H_1$ layer) that is made of a high-refractive index material and which has an optical thickness of $\lambda_0/4$ is combined with another high-refractive index layer ($H_2$ layer) that is made of another high-refractive index material and which has an optical thickness of $\lambda_0/4$.

7. A multi-layered back reflecting mirror according to claim (2) wherein the dielectric multi-layered coating is composed of dielectric layers that are formed on one side of the transparent substrate in the order of the 2H layer, L layer, H layer, L layer and H layer or in the order of the H layer, L layer, H layer, L layer and 2H layer.

8. A multi-layered back reflecting mirror according to claim (7) wherein the 2H layer is a combination layer in which a high-refractive index layer ($H_1$ layer) that is made of a high-refractive index material and which has an optical thickness of $\lambda_0/4$ is combined with another high-refractive index layer ($H_2$ layer) that is made of another high-refractive index material and which has an optical thickness of $\lambda_0/4$.

* * * * *